United States Patent
Yi et al.

(10) Patent No.: US 10,869,356 B2
(45) Date of Patent: *Dec. 15, 2020

(54) METHOD AND APPARATUS FOR PERFORMING INITIAL ACCESS PROCEDURE IN WIRELESS COMMUNICATION SYSTEM

(71) Applicant: LG ELECTRONICS INC., Seoul (KR)

(72) Inventors: Yunjung Yi, Seoul (KR); Daesung Hwang, Seoul (KR); Joonkui Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 98 days.

This patent is subject to a terminal disclaimer.

(21) Appl. No.: 16/020,356

(22) Filed: Jun. 27, 2018

(65) Prior Publication Data
US 2018/0332656 A1 Nov. 15, 2018

Related U.S. Application Data

(63) Continuation of application No. 14/763,487, filed as application No. PCT/KR2014/000690 on Jan. 24, 2014, now Pat. No. 10,039,142.

(Continued)

(51) Int. Cl.
*H04W 76/28* (2018.01)
*H04W 52/02* (2009.01)
(Continued)

(52) U.S. Cl.
CPC .......... *H04W 76/28* (2018.02); *H04L 5/0048* (2013.01); *H04W 24/02* (2013.01); *H04W 48/16* (2013.01);
(Continued)

(58) Field of Classification Search
None
See application file for complete search history.

(56) References Cited

U.S. PATENT DOCUMENTS 6,490,268 B1 12/2002 Lee et al.
2009/0221289 A1 9/2009 Xu et al.
(Continued)

FOREIGN PATENT DOCUMENTS

CN 102754468 A 10/2012
CN 102883408 A 1/2013
(Continued)

OTHER PUBLICATIONS

CMCC, "Discussion on common solution to support efficient operation for Rel-12," 3GPP TSG-RAN WG1 #72, R1-130537, St. Julian's, Malta, Jan. 28-Feb. 1, 2013, pp. 1-7.
(Continued)

*Primary Examiner* — Rebecca E Song
(74) *Attorney, Agent, or Firm* — Birch, Stewart, Kolasch & Birch, LLP

(57) ABSTRACT

A method is provided for transmitting a configuration in a wireless communication system. A Base Station (BS) transmits the configuration for a discovery signal. The configuration indicates a periodicity and an offset of the discovery signal. The discovery signal is used to perform a measurement by a User Equipment (UE). The discovery signal includes a Primary Synchronization Signal (PSS), a Secondary Synchronization Signal (SSS), and a Cell-specific Reference Signal (CRS), received within a predefined duration. The offset of the discovery signal is in a number of subframe(s). The predefined duration for transmitting all of the PSS, SSS, and CRS is set to 6 ms. The periodicity for transmitting all of the PSS, SSS, and CRS is set to 40 ms or 80 ms.

6 Claims, 10 Drawing Sheets

Related U.S. Application Data

(60) Provisional application No. 61/756,473, filed on Jan. 25, 2013, provisional application No. 61/815,240, filed on Apr. 23, 2013, provisional application No. 61/821,692, filed on May 9, 2013, provisional application No. 61/878,628, filed on Sep. 17, 2013.

(51) Int. Cl.
| | | |
|---|---|---|
| *H04L 5/00* | (2006.01) | |
| *H04W 24/02* | (2009.01) | |
| *H04W 48/16* | (2009.01) | |
| *H04W 88/02* | (2009.01) | |

(52) U.S. Cl.
CPC ... *H04W 52/0206* (2013.01); *H04W 52/0216* (2013.01); *H04W 88/02* (2013.01); *Y02D 30/70* (2020.08)

(56) References Cited

U.S. PATENT DOCUMENTS

| | | |
|---|---|---|
| 2010/0110897 A1 | 5/2010 | Chun et al. |
| 2012/0076105 A1 | 3/2012 | Yang et al. |
| 2012/0083278 A1 | 4/2012 | Kazmi et al. |
| 2012/0307670 A1 | 12/2012 | Kazmi et al. |
| 2013/0065612 A1 | 3/2013 | Siomina et al. |
| 2013/0273878 A1 | 10/2013 | Heo et al. |
| 2014/0086224 A1 | 3/2014 | Kwon et al. |
| 2014/0112243 A1 | 4/2014 | Suzuki et al. |
| 2014/0295829 A1* | 10/2014 | Turtinen ............... H04W 8/005 455/426.1 |
| 2015/0049649 A1* | 2/2015 | Zhu .................... H04W 52/325 370/277 |
| 2015/0117435 A1 | 4/2015 | Baldemair et al. |
| 2015/0215852 A1 | 7/2015 | Gou et al. |
| 2015/0365201 A1 | 12/2015 | Lunttila et al. |
| 2016/0044615 A1* | 2/2016 | Bashar ............. H04W 52/0212 370/280 |
| 2017/0078955 A1* | 3/2017 | Cheng .................. H04W 48/16 |

FOREIGN PATENT DOCUMENTS

| | | |
|---|---|---|
| JP | 2012-507971 A | 3/2012 |
| KR | 10-2001-0071869 A | 7/2001 |
| RU | 2 124 271 C1 | 12/1998 |
| WO | WO 2011/142715 A1 | 11/2011 |
| WO | WO 2011/155754 A2 | 12/2011 |
| WO | WO 2011/156638 A2 | 12/2011 |
| WO | WO 2012/079197 A1 | 6/2012 |
| WO | WO 2012/173424 A2 | 12/2012 |

OTHER PUBLICATIONS

Huawei et al., "Potential technologies for small cell enhancement—operation efficiency improvement," 3GPP TSG RAN WG1 Meeting #72, R1-130023, St. Julian's, Malta, Jan. 28-Feb. 1, 2013, 7 pages.

Intel Corporation, "Discussion on small cell discovery operation," 3GPP TSG-RAN WG1 #72, R1-130088, St. Julian's, Malta, Jan. 28-Feb. 1, 2013, pp. 1-4.

Nokia Siemens Networks et al., "Dense Small Cell Mobility with Realistic Cell Detection," 3GPP TSG RAN WG1 #72 Meeting, R1-130493, Malta, Jan. 28-Feb. 1, 2013, 5 pages.

* cited by examiner

METHOD AND APPARATUS FOR PERFORMING INITIAL ACCESS PROCEDURE IN WIRELESS COMMUNICATION SYSTEM

CROSS REFERENCE TO RELATED APPLICATIONS

This application is a Continuation of U.S. application Ser. No. 14/763,487 filed on Jul. 24, 2015 (now U.S. Pat. No. 10,039,142 issued on Jul. 31, 2018), which is the National Phase of PCT/KR2014/000690 filed on Jan. 24, 2014, which claims priority under 35 U.S.C. 119(e) to U.S. Provisional Application No. 61/756,473 filed on Jan. 25, 2013, U.S. Provisional Application No. 61/815,240 filed on Apr. 23, 2013, U.S. Provisional Application No. 61/821,692 filed on May 9, 2013, and U.S. Provisional Application No. 61/878,628 filed on Sep. 17, 2013, all of which are hereby expressly incorporated by reference into the present application.

BACKGROUND OF THE INVENTION

Field of the Invention

The present invention relates to wireless communications, and more particularly, to a method and apparatus for performing an initial access procedure in a wireless communication system consisting of multiple carriers over single frequency or multiple frequencies.

Discussion of the Related Art

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by coordination among eNBs for a UE is also feasible where multi-CC aggregation is achieved over multiple eNBs/nodes. Furthermore, to boost user throughput, data offloading to densely deployed small cells is also considered. To minimize the operation cost and also maximize energy saving, dynamic cell on/off and self-optimizing small cell operations are considered. Efficient operation schemes for small cell scenario include a new carrier type where restricted (or eliminated) controls is transmitted to enhance spectral efficiency and a cell management using a small cell cluster environment where some tight coordination among cells within a cluster can be considered and cells belonging to a cluster may perform dynamic cell on/off to minimize the interference and thus maximize the efficiency. As the behavior of the network may change (i.e., the network may be in off-state), it is need to be defined to perform an initial access procedure in a cell where legacy synchronization signals are not transmitted in the small cell cluster.

SUMMARY OF THE INVENTION

The present invention provides a method and apparatus for performing an initial access procedure in a wireless communication system.

The present invention also provides a method and apparatus for detecting a cell in a wireless communication system.

The present invention also provides a method and apparatus for changing a cell state from off state which is a discontinuous transmission (DTX) cell for system information and synchronization signals to on state which is a transmission (TX) cell for the system information and the synchronization signals in a wireless communication system.

In an aspect, a method for performing an initial access procedure in a wireless communication system is provided. The method may include detecting a discontinuous transmission (DTX) cell that operates in a discontinuous transmission (DTX) state by receiving a discovery signal from the DTX cell; transmitting an initial request message to the DTX cell to request the DTX cell to transition from the DTX state to a continuous transmission (TX) state; receiving a synchronization signal from the TX cell that transitions from the DTX state to the TX state; and performing a random access (RACH) procedure with the TX cell that operates in the TX state.

The method may further include acquiring a configuration for transmitting the initial request message, the configuration including subframe information and resource information, the subframe information indicating a subframe gap between a subframe at which the discovery signal is received and a subframe at which the initial request message is transmitted, the resource information indicating at least two resource blocks within a bandwidth in which the discovery signal is received.

In another aspect, a wireless device for performing an initial access procedure in a wireless communication system is provided. The wireless device includes a radio frequency (RF) unit for transmitting and receiving a radio signal; and a processor operatively coupled to the RF unit, wherein the processor is configured for: detecting a discontinuous transmission (DTX) cell that operates in a discontinuous transmission (DTX) state by receiving a discovery signal from the DTX cell; transmitting an initial request message to the DTX cell to request the DTX cell to transition from the DTX state to a continuous transmission (TX) state; receiving a synchronization signal from the TX cell that transitions from the DTX state to the TX state; and performing a random access (RACH) procedure with the TX cell that operates in the TX state.

The proposed embodiment supports that a wireless device transmits an initial request message to a discontinuous transmission (DTX) cell to request the DTX cell to transition from the DTX state to a continuous transmission (TX) state for acquiring synchronization signal and system information of a random access (RACH) procedure. Thus, more efficient and rapid initial access and data scheduling are supported.

DETAILED DESCRIPTION OF THE EMBODIMENTS

Figure 1:
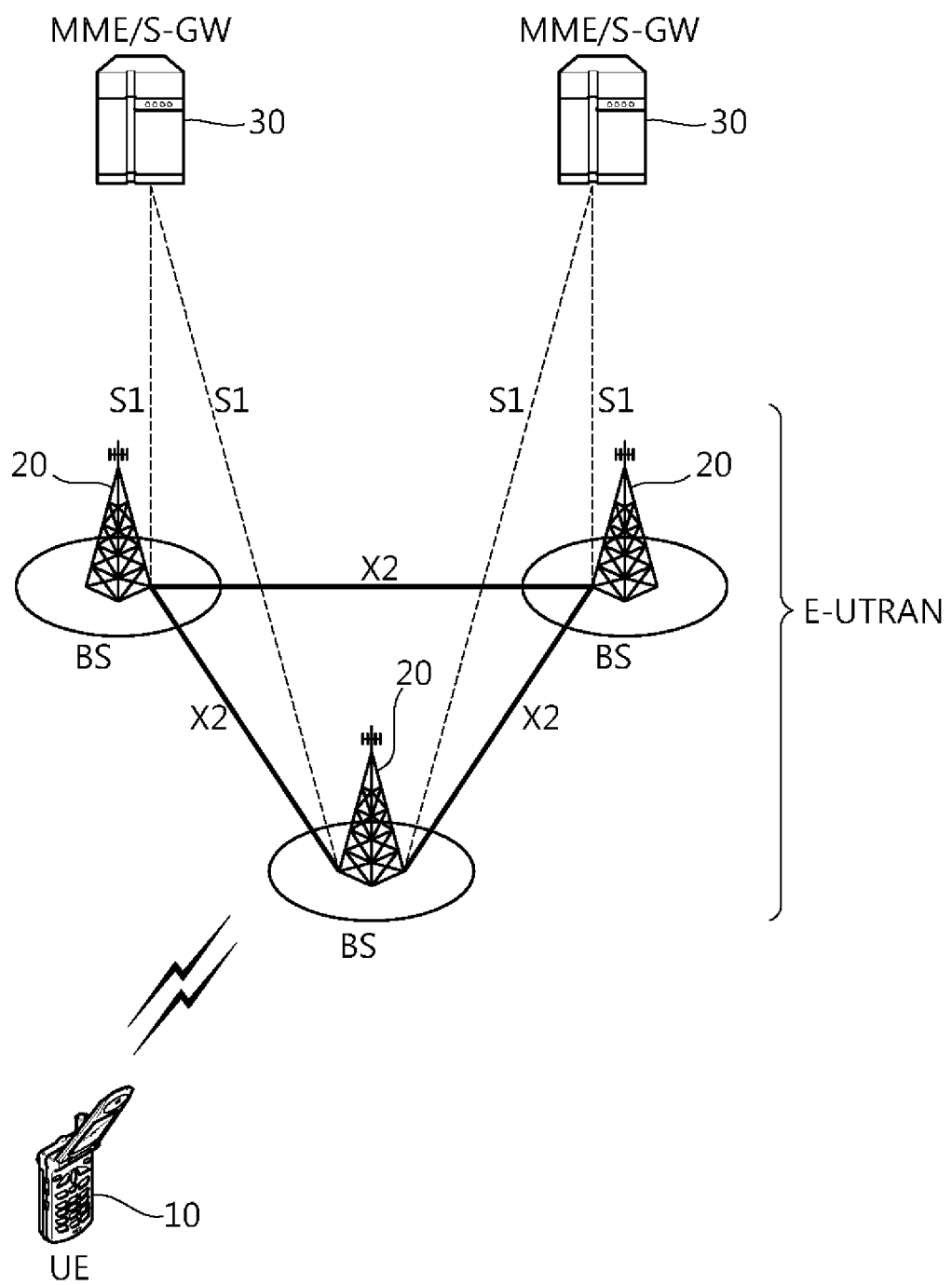
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
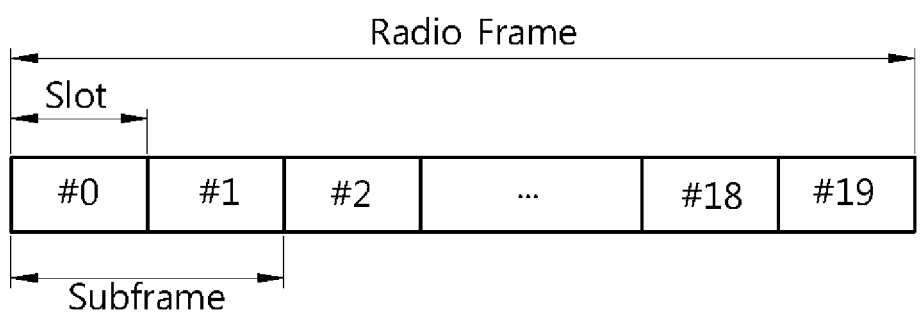
FIG. 2 shows a structure of a radio frame to which the present invention is applied.

FIG. 2 shows a structure of a radio frame to which the present invention is applied.

Referring to FIG. 2, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with the changeable manners to a corresponding system.

Figure 3:
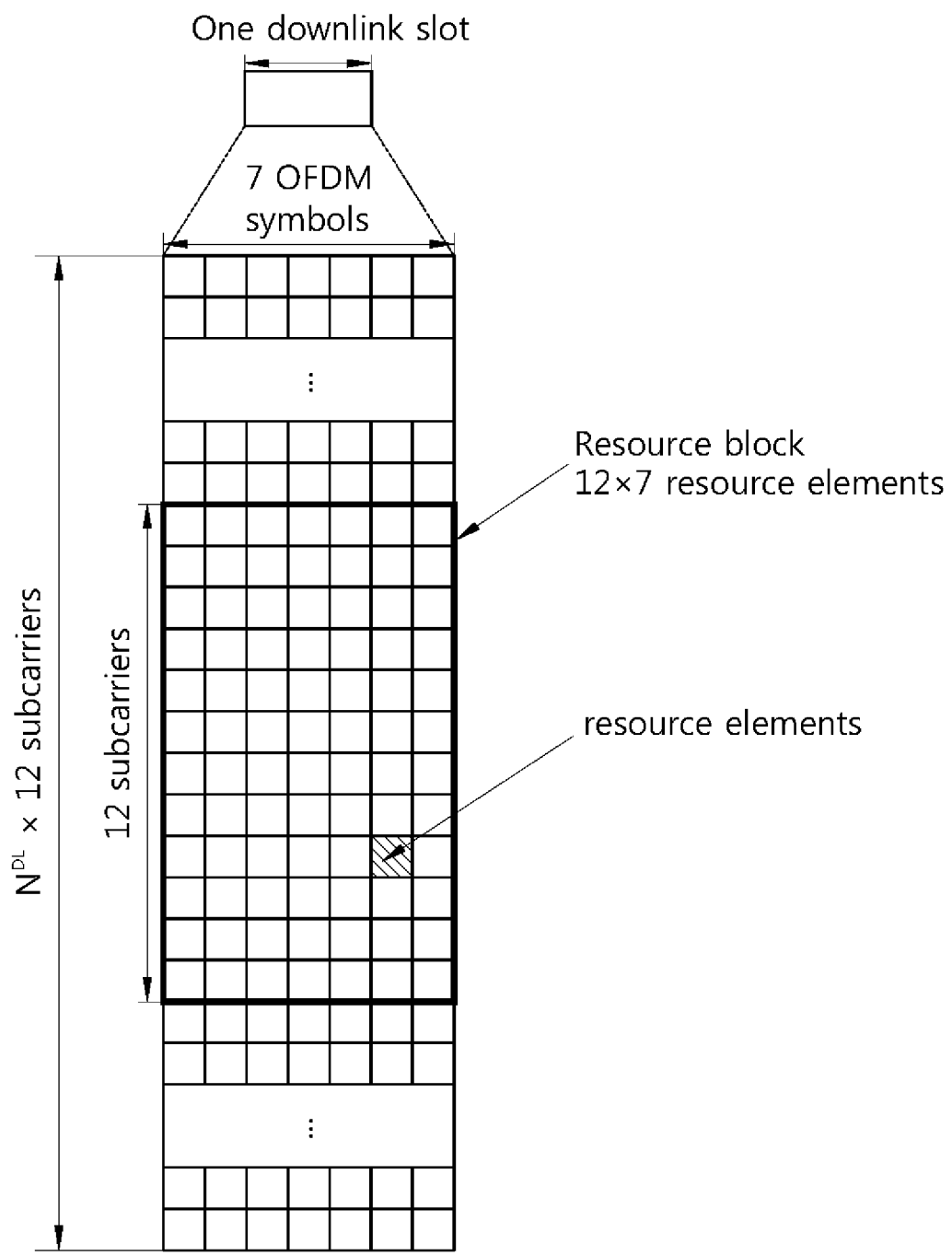
FIG. 3 is an exemplary diagram showing a resource grid for one downlink slot to which the present invention is applied.

FIG. 3 is an exemplary diagram showing a resource grid for one downlink slot to which the present invention is applied.

Referring to FIG. 3, the downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 4:
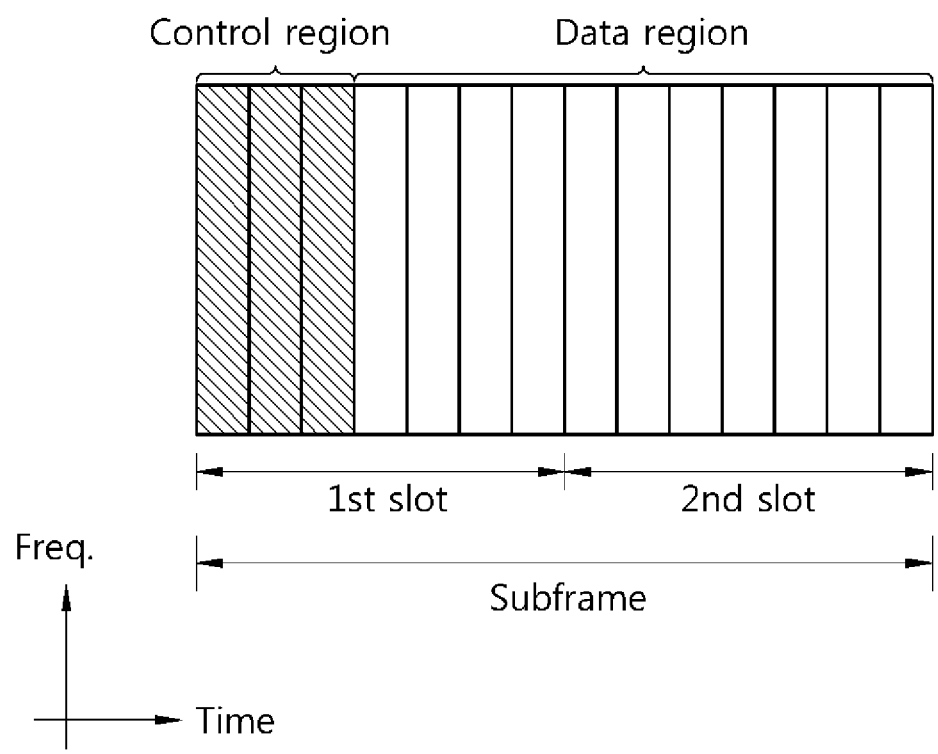
FIG. 4 shows a structure of a downlink subframe to which the present invention is applied.

FIG. 4 shows a structure of a downlink subframe to which the present invention is applied.

Referring to FIG. 4, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH), that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1-2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

- Carrier indicator - 0 or 3 bits
- Flag for identifying Format 0/Format 1A - 1 bit, 0 indicates Format 0, 1 indicates Format 1A.
- Frequency hopping flag - 1 bit; is a Most Significant Bit (MSB) corresponding to resource allocation at need and used to assign in multiple clusters.
- Resource block assignment and hopping resource allocation - $|\log_2(N_{RB}^{UL}(N_{RB}^{UL} + 1)/2)|$ bits
- PUSCH hopping (corresponding to only single cluster assignment):
- $N_{UL\_hop}$ MSBs are used to obtain an $\tilde{n}_{PRB}(i)$ value.
- $(|\log_2(N_{RB}^{UL}(N_{RB}^{UL} + 1)/2)| - N_{UL\_hop})$ bits provide the resource alllocation of the first slot of an uplink subframe .
- In single cluster assignment, non-hopping PUSCH
- $(|\log_2(N_{RB}^{UL}(N_{RB}^{UL} + 1)/2)|)$ bits provide the resource allocation of an uplink subframe.
- In multi-cluster assignment, non-hopping PUSCH: Resource assignment is is obtained from a combination of a frequency hopping flag field and a resource block assignment and hopping resource allocation field.

$$-\left\lceil \log_2\left(\left(\frac{\lceil N_{RB}^{UL}/p + 1\rceil}{4}\right)\right)\right\rceil$$ bits provide resource allocation in an uplink subframe.

Wherein, P depends on the number of downlink resource blocks.
- Modulation and coding scheme/redundancy version - 5 bits
- New data indicator - 1 bit
- TPC command for a scheduled PUSCH - 2 bits
- Cyclic shift and OCC index for DM_RS - 3 bits
- Uplink index - 2 bits, only exist for a TDD operation, that is, an uplink-downlink configuration 0
- Downlink Assignment Index (DAI) - 2 bits, only exist for TDD operations, that is, uplink-downlink configurations 1-6
- CQI request - 1 or 2 bits, a 2 bit field is applied to a UE configured using at least one downlink cell.
- SRS request - 0 or 1 bit.
- Multi - cluster flag 1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, the all the redundant bits may be set to 0 because they do not include special information. Of course, the number of redundant bits may be smaller than or greater than 2.

The wireless communication system of the present invention uses blind decoding for Physical Downlink Control Channel (PDCCH (or ePDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

An enhanced PDCCH (ePDCCH) which can be multiplexed with PDSCH can be employed to support multiple Scells of the CA. The ePDCCH can be one of solutions of limitation for a PDCCH transmission or new control information transmission of near future commination system including a new type of carrier. The ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

Figure 5:
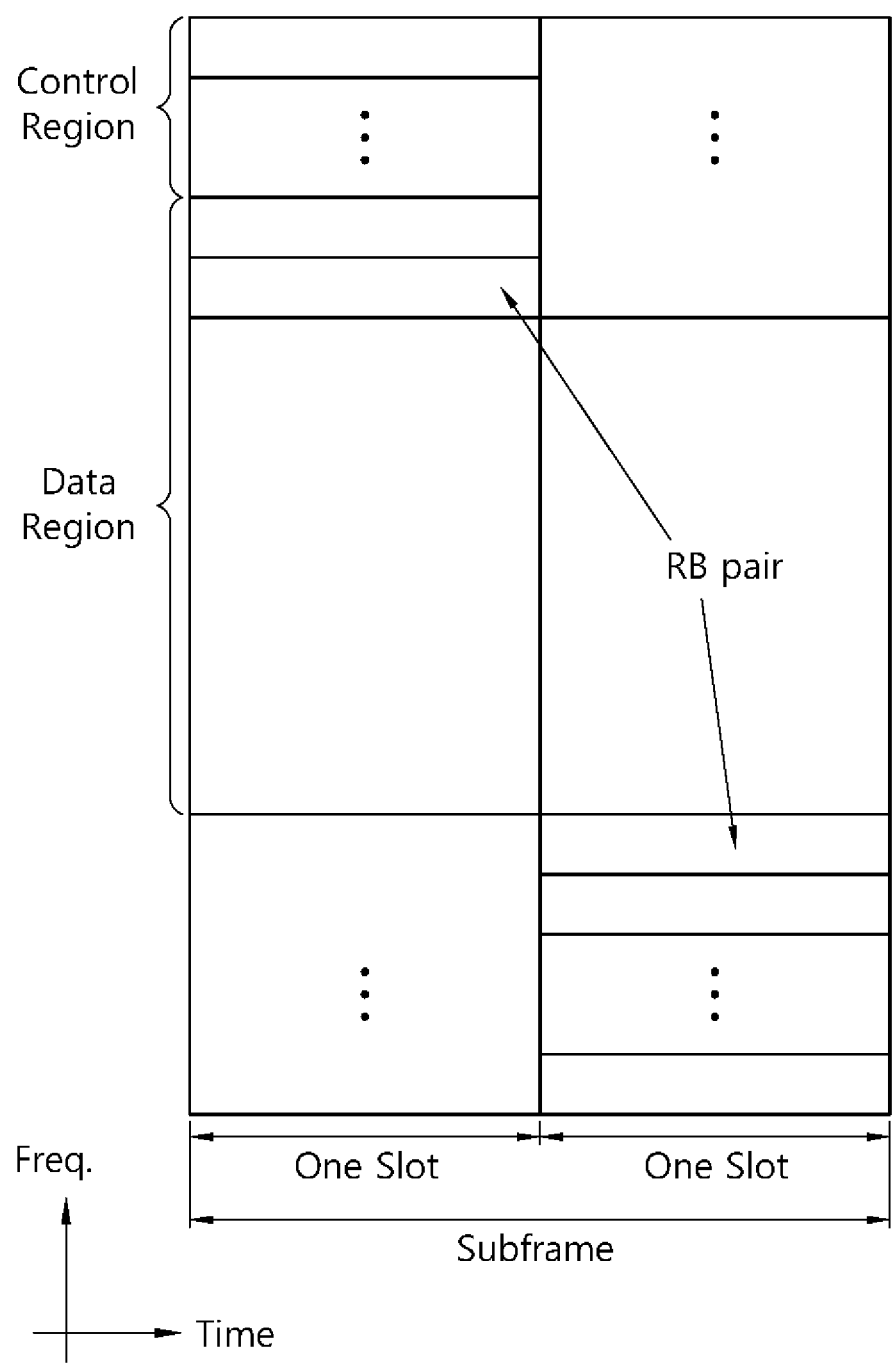
FIG. 5 shows an example of a structure of an uplink subframe carrying an ACK/NACK signal to which the present invention is applied.

FIG. 5 is a view illustrating an example of a structure of an uplink subframe carrying an ACK/NACK signal to which the present invention is applied.

Referring to FIG. 5, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

This invention provides solutions to support efficient transmission within a small cell cluster. More specifically, this invention provides small cell environments, to reduce UE power consumption due to RRM measurement, cell search, etc, using a discovery signal. The discovery signal may be transmitted with or without existing synchronization channel and may be transmitted in both active and inactive state or only in inactive state.

The concept of inactive or dormant state in this invention is introduced to reduce inter-cell interference from continuous cell-specific signaling such as CRS, CSI-RS, PCFICH, etc. In other words, by eliminating continuous signaling regardless of actual data transmission, unnecessary inter-cell interference can be removed. Whether to disable transmitting PDSCH/(E) PDCCH in inactive state is up to use cases. With reduced continuous signaling transmission overhead, if needed, data transmission to advanced UEs can be still feasible and may be beneficial.

In current LTE system, there are periodic signals transmitted regardless of the presence of UE. For example, PSS/SSS/MIB/SIB are transmitted to allow potential users to find cell-related information. When a discovery signal is introduced and a UE firstly identifies a cell by discovery signal, those signals such as the PSS/SSS/MIB/SIB may not have to be transmitted all the time. Rather, it can be transmitted on-demand. Thus, this invention proposes an initial access procedure with an assumption that discovery signal which may be different from PSS/SSS or transmitted with different periodicity or requirement is used. By discovering a cell with discovery signal without detecting continuous signals such as MIB, UE may be able to assume that the cell is in off-state. This invention proposes a mechanism to wake up those cells to continue initial access procedure. This invention may provide to transmit a request signal to check whether the cell is inactive state or active stat before the RACH procedure between the UE and eNB is started. Herein the sending initiation request signal is used for an exemplary signal to wake up a cell from a cell off state to attach the cell after detecting the discovery signal by the UE.

Figure 6:
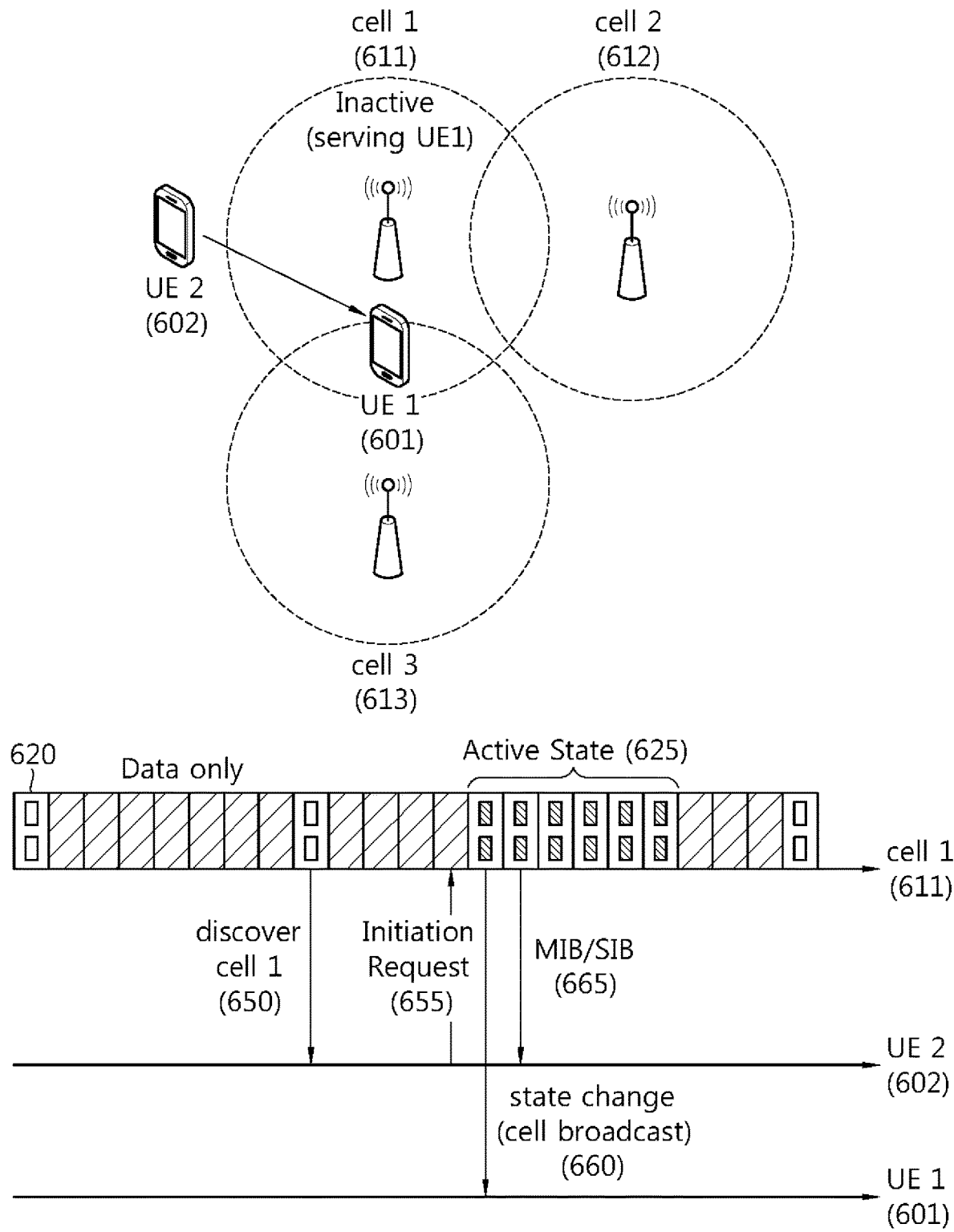
FIG. 6 shows an exemplary time flow for performing an initial access procedure as exemplary embodiment of the present invention.

FIG. 6 shows an exemplary time flow for determining a cell state according to an embodiment of the present invention.

As shown in the FIG. 6, a UE can transmit initiation request upon detecting a discovery channel, and thus the UE can wake up a potential small cell. Firstly, this invention focuses on UE-initiated request for an advanced UE. In other words, without coordination among eNBs, a UE upon detecting a potential serving cell which is in DTX mode can initiate wake-up procedure so that the cell can be ready for services for the UE. This invention, however, does not preclude the case where wake-up procedure can be triggered by another eNB such as control eNB in a small cell cluster where the UE is located in a cell or a serving eNB if a UE has already a serving cell. By this, a UE without capability of initiating wake-up procedure can be also serviced by DTX mode cells.

More details, the initiation request can be sent via one of RACH, SRS, and a discovery signal used in device-to-device communication. This may imply that format of PRACH, SRS or discovery signal in D2D can be reused. However, it does not directly imply that the same resource configuration and scrambling would be used. If PRACH is used for the initiation request, the same sequence used for PRACH can be used for transmitting the initiation request. In terms of transmitting timing and RACH resource, a predetermined timing and resource can be used or a discovery signal may carry the information regarding this initiation request configuration. Alternatively, if additional channel is transmitted along with a discovery channel, the additional channel may carry the information as well. While SRS is used, a SRS-type channel can be transmitted whether this SRS-type channel is different from a legacy SRS and it may use different scrambling and user RNTI to be distinct the SRS-type channel from the legacy SRS. More specifically, cell ID discovered from discovery signal may be used for determining cyclic shift for SRS sequence generation (such as cell ID % 8). The configuration for transmitting SRS is similar to the PRACH approach. That is, a predetermined timing and resource for the new SRS-type can be used or a legacy SRS signal may carry the information regarding this initiation request configuration. Alternatively, if additional channel is transmitted along with the SRS-type channel, the additional channel may carry the information as well. Either pre-fixed or indicated by the discovery channel scheme can be used. Lastly, if a discovery signal is used in D2D, that is, another mechanism is to use device-to-device discovery signal with different initialization and potentially resource so that it can be differentiated from a D2D discovery signal.

Once the dormant mode (or inactive) small cell detects the initiation request signal, the small cell becomes active state where legacy synchronization signals may be transmitted. Herein the dormant mode (or inactive) small cell can receive the initiation request signal with or without proper admission control. When the cell is dormant mode, the cell is not considered to transmit any RS signal or synchronization signals, so a UE may not expect to receive none of the RS signals and synchronization signal. Meanwhile, as legacy UEs would not have initiation request, at least a subset of small cells may have to transmit legacy channels. Once the active state is triggered, eNB may enter into inactive/dormant state after T time (e.g., T=200 msec) without any active UE. Also, the cell state of change shall be known/informed to existing UEs or attached UEs so that existing UEs (or attached UEs) can expect legacy signals transmitted if needed for an example to support effective neighbor cell measurement or data rate matching decision if data can be transmitted in dormant mode without CRS. One mechanism to switch the state is to use different cell ID or virtual cell ID at scrambling so that a UE knows whether the cell is in active state or inactive state.

Furthermore, the initiation request signal of characteristic is described as below. As initiation request can be sent even before a UE acquires system information of a cell and synchronization signals, to support that the UE knows the cell ID and the necessary configuration information, when the UE reads the discovery signal, a mechanism is needed how to determine the initiation request sequence and resource. For this, the following design considerations may be necessary. For convenience to explain, the initiation request based on RACH is shown.

Firstly, Preamble format for the initiation request is explained. As initiation request can be used for small cell environment, CP length and sequence length would not be so large. A new RACH preamble format (or shorter RACH preamble format than a legacy RACH preamble format) may be supported. For example, preamble format 0 or 4 is used for explaining the initiation request. Or, if synchronization cannot be assumed, in other words, the UE may not be able to acquire fine time tracking via a discovery signal, the long CP may be necessary. In this case, using the extended CP for a discovery signal can be also considered. If the extended CP is used for a discovery signal whereas synchronization signal transmitted in on state can use normal CP, either a UE may not assume any CP length identified from the discovery signal, or a UE is configured with CP length used in the new target cell if UE is performed to hand-over to the new cell, or a UE assumes CP length identified from PSS/SSS is valid only. In that case, preamble format 1 can be used.

The decision of which preamble to use for initiation request may be done by reading discovery signal. PRACH CP length may follow CP length of discovery signal and the sequence length may be selected based on estimated path-loss measured by a discovery channel. Or, if a discovery signal uses normal CP, CP length of initiation request would be same as preamble format 0. Herein, the discovery signal uses extended CP, CP length of initiation request would be same as preamble format 1 CP length, or the discovery signal uses short CP, CP length of initiation request would be same as preamble format 4 CP length.

And, subframes for the initiation request is needed to configure. PRACH is allowed only a subset of subframes indicated by system information (or RACH configuration). The initiation request may be transmitted even without reading any system information. There are several alternatives.

The initiation request can be sent in any subframe (except for subframes carrying discovery signals in TDD). if duplex mode is not known to UE, to be safe, the same subframe used for discovery signal is not used for PRACH transmission. If discovery signals are transmitted in dormant/off state, it may be assumed that eNB will listen to uplink transmission in other subframes other than time used for transmitting discovery signals. Or, a fixed subframe offset or gap from receiving discovery signal can be used. The fixed gap between discovery signal and initiation request can be set with a predetermined value. For example, a constant C (e.g., 6) can be used. Or, a user ID can be used to determine the offset when a UE was attached to any cell, a previous C-RNTI (cell-Radio Network Temporary Identifier) may be used or self-generated user ID. For example, the user ID % M can be used for the offset where M is the maximum allowed offset (e.g., 10). Or, the offset can be determined based on ID identified by discovery signal (e.g., ID % M). Or, the initiation request can be sent by a configuration or on the discovery signal. A discovery signal transmission configuration for initiation request may be followed. The information of the configuration for initiation request may be carried in additional signal along with the discovery signal. Or, a gap can be used between two discovery signals (i.e., the period). A UE may transmit initiation request based on discovery signal period where the period may be used to determine M (the max offset) for Alt' (as using the fixed subframe offset/gap) or Alt2 (as using the configuration), or a random generated offset can be used within M offset.

For initiation request, both FDD/TDD case shall be considered. In both case, a UE may assume that it will use the same frequency where discovery signal is transmitted unless uplink frequency is indicated to the UE via either discovery signal or other network signaling or configuration. To determine the resource for PRACH is followings.

PRACH Frequency for initiation request can use the entire bandwidth where the UE discovers discovery signal. For example, if discovery signal is detected over 10 PRB, initiation request may be sent over 10 PRB as well. Another way is to use the center 6 PRB among discovery signal bandwidth, or to use the center 2 or 4 PRB within discovery signal bandwidth. The other is to use any consecutive 2 or 4 or 6 PRB within discovery signal bandwidth.

Meanwhile, RACH Sequence, which a network configures the set of preamble sequences the UE is allowed to use, for the initiation request is followings. The RACH_ROOT_SEQUENCE can be set as an index to read Table 4 or Table 5. The index can be determined based on ID identified by discovery signal (ID % 32 if preamble format 1-3 is used, ID % 7 when preamble format 4 is used). Or discovery signal may carry the index to the table for ZC sequence. Or, a list of pair {cell ID, default parameter for PRACH generation} can be transmitted in advance or pre-configured such that a UE can acquire PRACH related parameters even before receiving system information from the DTX cell. If the UE has visited the cell before and learned parameters, those parameters can be used instead. Alternatively, the root index can be also signaled by discovery signal itself. If predetermined, rootSequenceIndex may be calculated as (cell ID+m) % 838 or some function of cell ID.

Here, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the System Information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Tables 4 and 5 for preamble formats 0-3 and 4, respectively. The Table 4 is shown with RACH_ROOT_SEQUENCE by Root Zadoff-Chu sequence order for preamble formats 0-3, and Table 5 is shown for preamble format 4.

TABLE 4

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| . . . | . . . |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

TABLE 5

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | | |

And, $N_{CS}$ may be fixed (0) or determined by ID by discovery signal or user ID.

Alternatively, a ROOT_SEQUENCE and $N_{CS}$ can be inferred from discovery signal. For example, if discovery signal uses ZC sequences, then the same or the mapped root sequence can be used to deliver a RACH to that cell. For example, the index 3 is mapped to index 7 and discovery signal uses index 3, then index 7 will be used to generate initiation request to the cell. If the index is chosen based on user ID randomly, the transmission time of the signal may be fixed based on user ID as well. Another mechanism to infer root sequence by discovery signal is to utilize the periodicity of discovery signal.

This invention supports that this initiation request can be used for multiple purposes. For example, it can be used to wake up the dormant small cell (inactive cell, off cell) or request necessary information to acquire the cell or eNB measurement on the UE, etc. More specifically, a UE may transmit this message even without receiving any discovery signal. In other words, based on history information, a UE may assume that there is at least one small cell in the proximity, and then it may transmit this message using previous information to determine frequency to transmit the signal. Furthermore, a transmitting this initiation request may be allowed only if a UE detects cells with discovery signals only, i.e., no synchronization signals are detected, in other words, no active cells are around. That is, active cells have higher priority than inactive cells in terms of acquisition. This initiation request, however, can be transmitted if an active cell has requested.

Also, this invention supports that this initiation request message may not expect to receive RANDOM ACCESS RESPONSE and thus retransmission of PRACH is not expected for initial request purpose. When a UE is attached to a cell, the information or resource configuration of initiation request to another cell can be delivered to the UE by the serving cell.

However, also regular RACH procedure triggered by this initial request is not precluded. In this case, more specifically, a UE may use repeated PRACH transmission until it has successfully received either random access response from an eNB or it has detected a cell so that it can initiate Camp-On procedure. Thus, RAR response is expected from the cell once initial request has been transmitted.

The duration between two consecutive PRACH transmissions can be higher-layer configured. Initial power for the first PRACH transmission can be also higher-layer configured. Or, the initial power can be calculated based on pathloss estimation using discovery signal assuming that discovery signal power is known or discovery signal has been transmitted with maximum power. Also, for target received power, the maximum received power is assumed if not configured otherwise. In terms of the number of repeated PRACH until the successful RAR or cell detection can be higher layer configured as well or preconfigured. Power scaling factor per each PRACH transmission to wake up or initiate the request can be higher layer configured with a higher-layer configured maximum power value or preconfigured. Here, the present invention supports that power scaling or power ramp-up delta value per retransmission can be configured to be zero in which case an UE shall not increase the power even with retransmission. The latency which the UE shall be waiting for a RAR or cell detection to decide whether PRACH is successful or not, i.e., PRACH retransmission timer can be higher-layer configured or pre-determined.

The invention considers that this applies not only for PRACH but also for other uplink signal which can be used for either initiating the request of cell association or waking up an eNB for the cell association. For example, if PUSCH is used for initial request, instead of C-RNTI, cell ID discovered by discovery signal may be used for scrambling.

As described, when the cell 1 (611) is in an inactive serving cell for UE 1 as legacy UE (601), the UE 2 as advance UE (602) is moved to coverage overlapped cell 1 (611) and cell 3 (613), the UE2 can discover cell 1 by detecting the discovery signal which is different from PSS/SSS or transmitted at subframes configured with different periodicity or requirement of cell 1 (650) and then the UE can transmit initiation request upon detecting a discovery channel (655) so that cell 1 may change to wake up from a dormant small cell (inactive cell, off cell, 620) to on state (625). Thus, measurement signals such as PSS/SSS/MIB/SIB in the cell 1 (active state cell) are transmitted to allow potential users to find cell-related information via cell broadcasting (660, 665).

Herein, the discovery signal mentioned in this invention may include a periodic signal which carries cell-related information partially or fully. For example, PSS/SSS may be one type of discovery signal. Even though it mainly focuses on inactive/dormant state discovery signal, techniques are applicable to active state as well. Furthermore, a mechanism to select parameters for the initiation request based on RACH can be applicable to initiation request based on other signals such as SRS. This technique can be applied to coverage limiting UEs where the presence of a coverage limiting UE is known to the eNB as soon as possible would be beneficial. After that, the UE 2 can determine to change cell 1 or other target cell from a source cell x by measuring a Radio Resource Management (RRM) measurement using the measurement signals of the cell 1. That is, UE can perform a necessary cell discovery and a necessary initial RRM measurement by using discovery signal and initial request signal.

Alternatively, a hybrid approach of periodic discovery signals and UE-initiated wake-up signals can be considered as illustrated in the following figure.

Figure 7:
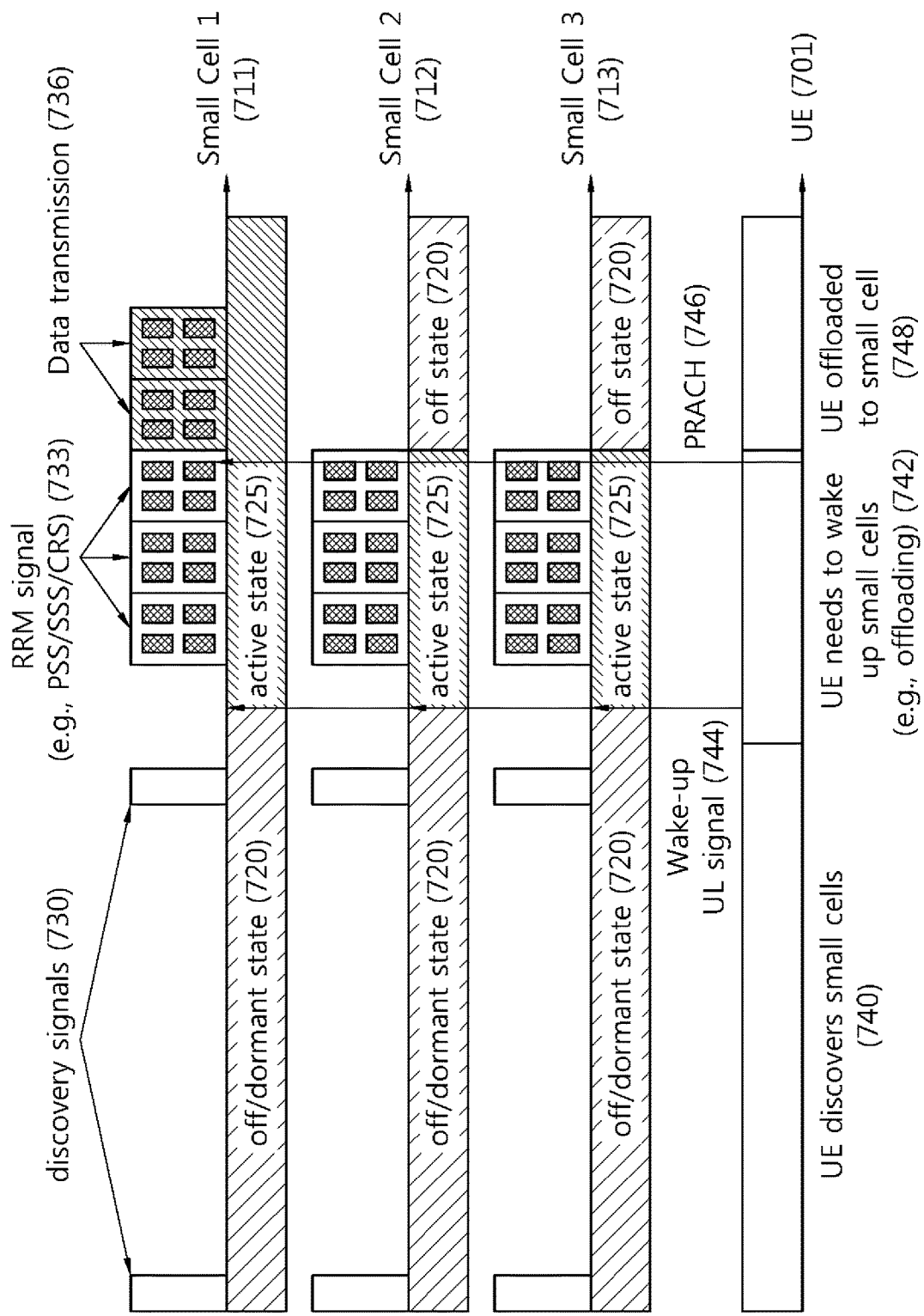
FIG. 7 shows exemplary alternatives for Hybrid of discovery and UE-initiated wake-up signal as exemplary embodiment of the present invention.

FIG. 7 shows an exemplary Hybrid scheme of discovery and UE-initiated wake-up signal as exemplary embodiment of the present invention.

Referring FIG. 7, a small cell may transmit periodic discovery signals which can be synchronized among small cells where the periodicity and the offset using approach of the invention. Herein, the discovery signal transmission can occur in radio frame or subframe, and the periodicity and the offset using can be configured either by the macro cell or an anchor cell or cluster master cell. Based on discovery signals, UE can perform a necessary cell discovery and a necessary initial RRM measurement. A UE can be higher layer signaled with discovery signal periodicity and/or offset by a macro cell to discover small cells. Or, the discovery signal offset/periodicity may be aligned with inter-frequency measurement gap such that a UE may be able to discover at least one discovery signal in a measurement gap. This approach would be useful especially for legacy UEs.

To support this, each eNB may exchange or a macro-eNB may transmit the measurement gap configuration of a legacy or advanced UE. Upon receiving this information, each eNB may determine whether to align its discovery signal transmission to measurement gap configurations of other UEs. If it is not aligned, an eNB may decide to transmit additional discovery signal to support legacy UE-measurement gap. Not to increase discovery signal overhead too much, this additional transmission may be limited to UEs within its proximity based on UE uplink signaling monitoring or other means such as eNB information exchange.

In other word, the UE may discover at least one discovery signals (740) using the configuration or a preset radio frame (or subframe) (730), and then when a UE or the serving cell decides data offloading to small cell layer, a UE or the serving macro cell initiates the wake-up process (742).

If it is initiated by the UE, the UE may transmit PRACH, SRS or PUSCH pre-configured or pre-defined signals for wake-up process (744). Upon receiving the wake-up signals, a small cell can be in active state (725) at least for T msec from off state (720).

For example, the starting n+k subframe assuming wake-up signal has been received at subframe n and k>=1. If a small cell has not received a successful PRACH during the active time, it may go into dormant/off state and continues transmission of discovery signals. Herein, the T can be either configured by macro cell or predetermined. Furthermore, the duration T can be adapted based on wake-up signal frequency if more wake-up signals are received, the longer T can be used or the repetition of PRACH from the same UE. Furthermore, if a UE transmits more than one PRACH, the duration T can be increased.

To support better CSI feedback and RRM measurement, an eNB may transmit higher layer signals to indicate a UE to re-start its CSI or RRM measurement at a certain subframe or timeframe or indicate the inaccurate duration where CSI or RRM measurement should not be taken. For example, CSI feedback or RRM measurement of an already active UE may not be performed during the wake-up process time where small cells are transmitting RRM signals to support a UE 및 cell association/selection (733). That is, the UE or the serving cell decides data offloading to small cell layer (736) and starts data transmission on a selected cell among the small cells (711, 712, and 713). For the data transmission, the UE can transmit PRACH with using RACH configuration (746) and receive the offloading data via the cell 1 (711) which is on state (748).

Furthermore, a set of subframes can be signaled where a UE is not expected to measure CSI or RRM.

As described, the UE performs RRM measurement, and determines that the small cell 1 is the best cell among the small cells 1, 2, 3 for the data transmission, so the cell 2, 3 may transfer from active state to off state. PHICH or downlink HARQ-ACK during the off state is explained. It is further noted that downlink HARQ-ACK or uplink grant scheduling can be delivered during cell off state. Further restriction to a set of subframes where HARQ-ACK and/or uplink grant can be delivered can be higher layer configured.

In this invention, a couple of considerations to support a legacy UE is provided as followings. To support RRC_Idle mode UEs, continuous transmission of legacy signals are expected such as PSS/SSS/CRS and also MIB/SIB/etc. But, it is not easy to optimize signaling.

For this, this invention provides that RRC_IDLE mode UE is not supported in a cell with on/off functionality or cell performing cell on/off. In other words, a cell performing cell on/off would be excluded from initial cell search or cell search when the legacy UE is in RRC_IDLE mode. Thus, a legacy UE with RLF on a serving cell may not be able to identify or detect a cell performing on/off. It is also notable that a cell which supports cell on/off does not mean that it performs cell on/off. It can be configurable whether to apply cell on/off or not. When a cell transmits discovery signal, it may be considered that the cell performs cell on/off. Or, on-state cells can transmit discovery signals where legacy measurement signals are also transmitted as well. However, discovery signal and cell on/off can be separate configurations as well. One implication of UE in RRC_IDLE mode may not be supported for cell on/off performing cell. Herein, the UE may not use any measurement based on discovery signal rather than legacy PSS/SSS/CRS for cell (re)selection in RRC_IDLE mode even though discovery signals are transmitted by all cells. Alternatively, an advanced UE may use a discovery signal based measurement for cell selection. In this case, a UE may need to transmit a wake-up or an indication signal to the cell identified as a candidate to transmit necessary system information to proceed on camp-on process. The reason of not supporting RRC_IDLE legacy UE by off-state cell is to avoid performance degradation of legacy UE as off-state cell may not transmit necessary channels/signals for cell association procedure that legacy UE requires.

In addition to, inter-frequency measurement is defined as followings. There are two measurement gaps defined for non-CA capable UEs. To support inter-frequency measurement, a discovery signal can be transmitted by being aligned with legacy UE measurement gap. A controlling eNB or macro-eNB may configure or recommend the configuration of measurement gap so that other eNBs may reflect the information in their discovery signal periodicity/design. It is also noted that PSS/SSS/CRS can be transmitted in addition to discovery signal in inter-frequency measurement gap of a legacy UE. For this, the measurement gap of a legacy UE should be known to eNBs. It is also desirable to align measurement gap among legacy UEs at least to minimize the additional overhead. The CRS can be transmitted only in 6 PRB and also PSS/SSS can be transmitted according to legacy protocol. This information may be informed to the advanced UEs so that it can be reflected in UEs measurement process or determining the priority or data rate matching when signals collide. For example, the advanced UE with CRS cancellation capability need to know neighbor cell's CRS transmission pattern to successfully perform cancellation. Alternatively, a UE may perform blind decoding of both cases where first case without assuming CRS transmission and the other case with CRS transmission. Based on the blind detection, a UE may identify whether the CRS is transmitted or not in that subframe. When a UE is CA capable and a macro-cell wants to configure SCell among cell on/off performing cells, UE's uplink signal may be used for identifying a potential best cell for SCell and normal procedure of SCell addition can be performed after the candidate cell becomes active and starts transmitting measurement signals continuously. In this case, a serving cell may inform the configuration of PRACH or any other uplink signal used for UE monitoring by candidate cells in prior to actual uplink transmission where the configuration includes resource and time information of uplink transmission. Upon receiving this configuration which can be configured semi-statically or dynamically via eNBs communication (e.g., X2 or Xn signaling), the UE may monitor potential neighbor cells and the measurement results by the UE may send to the serving cell. This measurement can be periodic or aperiodic.

Meanwhile, Intra-frequency measurement may be defined as followings. In case that RRC_Connected legacy UEs are supported only by cell on/off performing cells, intra-frequency measurement is mainly for identifying cells better than the serving cell. If restricted measurement is supported, the serving cell may configure a restricted measurement subset and inform the configuration to neighbor cells such that neighbor cells can transmit measurement signals at the configured subframes. Or, a UE 웹 uplink signal can be monitored by a set of small cells (or neighbor cells) to detect potential hand-over trigger condition. When an eNB detects that the UE moves near to the eNB itself based on UE uplink signal strength, it may turn on itself and starts to transmit measurement signals. So the UE can successfully identify the candidate neighbor cell.

Or, if a UE supports CoMP operation, a set of neighbor cells can be configured to the UE as a CoMP set where the UE reports CSI reports for each neighbor cell. Based on CSI reports, the cells may determine to switch the serving cell and perform hand-over procedure accordingly. Or, if a serving cell has a legacy UE attached, it may inform to its neighbor cells such that neighbor cells start transmitting of measurement signals such as CRS continuously. Since intra-frequency of a UE would be initiated when the quality of serving cell becomes lower than a threshold, this restricted measurement the mechanisms listed here could be further limited to be triggered or configured when a UE reports its measurement on serving cell becomes poor. For example, for neighbor cell intra-frequency measurement and triggering (to transmit measurement signals) may be configured at that point. Or, simply neighbor cells start to transmit measurement signals to aid UE 웹 hand-over when it detects there is at least one legacy UE within its proximity. To trigger this, when the serving cell detects (either by receiving UE measurement or monitoring UE uplink signal strength) that the UE may need hand-over, it triggers intra-frequency among neighbor cells. Once neighbor cells receive trigger message, it may start transmitting of measurement signals.

Figure 8:
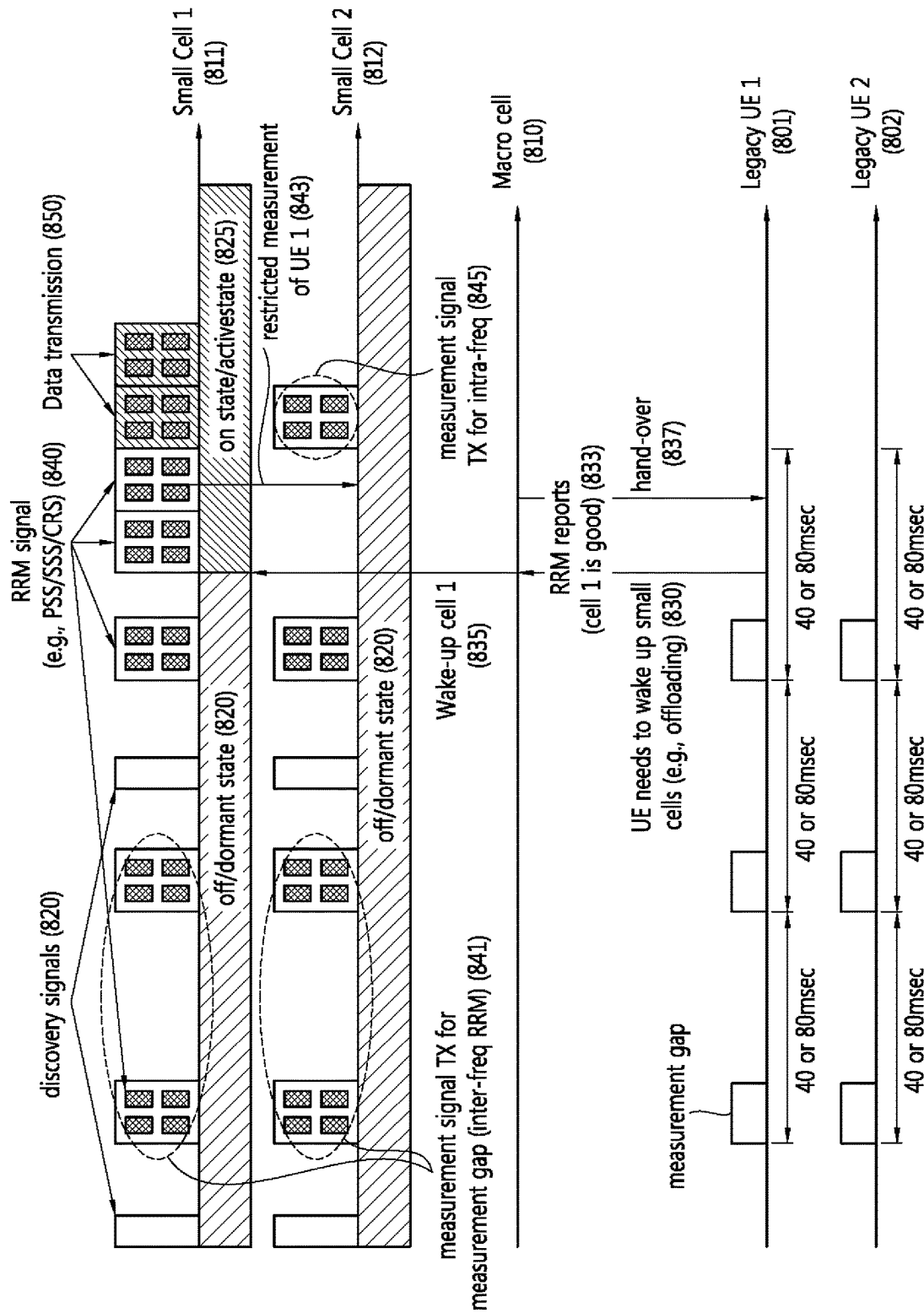
FIG. 8 shows an exemplary time flow for RRM measurement by cell on/off as exemplary embodiment of the present invention.

FIG. 8 shows an exemplary RRM support scheme by cell on/off as exemplary embodiment of the present invention.

Depending on inter-frequency measurement gap and restricted measurement configuration, this invention shows whether measurement signal can be transmitted or can be omitted would be affected. For example, a simple solution would be to transmit PSS/SSS every 5 msec (or 10 msec) and decide whether to transmit CRS or not depending on (1) inter-frequency measurement gap pattern of legacy UEs and (2) intra-frequency measurement configuration (continuous or restricted measurement set can be considered) of legacy UEs. It can be further limited to legacy UEs within its vicinity or proximity.

Transmitting PSS/SSS/CRS may have one of following patterns. In dormant/off state, PSS/SSS/CRS transmission may not be transmitted. As for continuous transmission of PSS/SSS/CRS, a cell may keep transmitting of measurement signals, but, system information and other information such as paging supported for RRC_Idle mode UEs may not be transmitted. Other way, a chunk of 6 msec PSS/SSS/CRS transmission may be transmitted in every 40 msec, in this case, measurement signals may be transmitted during 6 msec in every 40 msec with variable offset (i.e., 40 msec periodicity, 6 mesc duration, starting subframe can be varying) or a chunk of 6 msec PSS/SSS/CRS transmission may be transmitted in every 80 msec, in this case, measurement signals may be transmitted during 6 msec in every 80 msec with variable offset (i.e., 80 msec periodicity, 6 mesc duration, starting subframe can be varying).

One of the above patterns can be used to add in addition to discovery signal or replace discovery signal or used as discovery signal. Switch between one of the above patterns to another pattern among the list can be performed dynamically or semi-statically. To support this, eNBs exchange the pattern used or a pattern requesting for a neighbor cell to use. A UE may be informed with a chosen pattern or reconfigured with new pattern when the pattern has changed so that it can properly expect RS overhead and other signaling collision handling properly. Alternatively, a UE may perform blind detection to identify which pattern is used. Each UE without knowing the pattern may perform blind detection (BD) of CRS transmission for each pattern (i.e., four BD occasions) and then it determines which pattern is used.

The information about the patterns can be utilized for efficient operations such as data rate matching, collision issue or a cancellation of CRS and synchronization signal. Furthermore, this can be extended to differentiate 'on' and 'off' state as well where on-state may continuously transmit CRS and off-state may transmit CRS with a pattern. It is notable that in terms of CRS transmission, it can be further considered that only two OFDM symbols carry CRS in MBSFN-feasible subframes (e.g., #1, #2, #3, #6, #7, #8 for FDD and #3, #4, #7, #8 and #9 for TDD. Furthermore, in terms of number of CRS port, it can be assumed that CRS port 0 is used for measurement signal transmission. Of course, alternatively, the same number of CRS ports can be assumed to be used regardless of cell on/off states if CRS is transmitted.

To support this, advanced UEs may need to send whether it supports advanced discovery signal based measurement/cell detection or not. If advanced UEs without supporting discovery signal enhancement, it should be considered as legacy UEs. When this pattern can be used, a UE may experience two different measurement signals with one of an enhanced discovery signal and the other of legacy measurement signals.

This approach for transmitting measurement signals irregularly/dynamically to support legacy UEs, may increase the complexity at advanced UEs. For simplicity to reduce the complexity at advanced UEs, this invention has a priority to show that advanced UE performs intra-frequency and inter-frequency measurement using the discovery signals only if discovery signal is present.

A simple approach to handle additional a discovery signal or transmission of legacy signals is to ignore those signals. In other words, those signals are assumed as interference from advanced UE perspective and thus would not be used for measurements. However, when those signals and other channels/signals collide e.g., PSS/SSS for legacy UE measurement and CSI-RS for advanced UE CSI measurement, some handling would be necessary. To care for these cases, this invention shows to process the signals as below.

For PSS/SSS and CSI-RS collision, if CSI-RS configured to legacy and/or advanced UEs collide with PSS/SSS transmitted to support legacy UEs measurement, this invention may assume that CSI-RS configuration colliding with PSS/SSS would not be transmitted in the subframe of collision. To support this, the configuration of PSS/SSS and/or CRS transmissions in addition to discovery signal to support legacy UEs should be informed to advanced UEs. One example of this signaling can be bitmap of subframes, for example, 40 subframes where each bit indicates whether PSS/SSS and/or CRS is transmitted in that subframe.

Or, for CRS and discovery signal collision, if discovery signal uses REs used for CRS transmission as well to maximize the multiplexing capability, there could be cases where CRS and discovery signals may collide. In this case, it can be assume that either discovery signal has higher priority or CRS has higher priority. If discovery signal has higher priority, some CRS REs colliding with discovery signal may be punctured or the whole subframe may not carry CRS. If CRS has higher priority, some discovery REs colliding with CRS may be punctured or the whole subframe may not carry discovery signal.

Or, for PSS/SSS and discovery signal collision, it is similar to CRS and discovery signal collision; either signal can have higher priority. As PSS/SSS may lead UE performance degradation slightly in terms of detection time, it is desirable to drop PSS/SSS rather than discovery signal. However, the other way can be considered as well. In this case, either signal with lower priority would be dropped or punctured.

Or, CRS V-shift issue can be supported, if discovery signal does not use CRS v-shift, it may be also possible that one subframe may need to transmit CRS with V-shift to support legacy UEs and CRS without V-shift for discovery signal. In this case, approaches of CRS and discovery signal collision can be used.

Meanwhile, for PMCH and discovery signal collision, this invention handles that for a UE who is receiving MBMS service would not expect to read discovery signal at the subframe. PMCH may be still transmitted as well as the discovery signals are, thus other UEs not reading PMCH may be still able to read discovery signals.

Referring to FIG. 8, the UE can detect two cells with cell 1 and cell 2 by hearing a discovery signal (820) to be transmitted at subframes predetermined using configuring a configuration or a preset radio frame (or subframe) having a gap or offsets from a subframe where the cell 1 and cell 2 transmits the PSS/SSS and/or CRS. More details, for Inter-frequency measurement of legacy UEs, as UE 1 (801) and UE 2 (802) can be applied that two measurement gaps such as 40 or 80 msec to be defined for non-CA capable UEs. The UE 1 and UE 2 can detect a discovery signal (820) which is transmitted by being aligned with the measurement gap (840). Here, a controlling eNB or macro-eNB may configure or recommend the configuration of measurement gap so that cell 1 and cell 2 may reflect the information in their discovery signal periodicity.

After discovering at least one discovery signals (820), and then UE 1 or UE 2 may needs to wake up a small cells to process data offloading to small cell layer with cell 1 (830). The UE may transmit a wake-up signal via one of the PRACH, SRS and PUSCH pre-configured or pre-defined signals to wake up the cell 1 to on state from the off state (835). The small cell 1 can be on state with at least for T msec upon receiving the wake-up signal, the T msec is configurable or predetermined, for example, T=0, 100, 200. Also the UE 1 or UE 2 can perform the inter-frequency measurement using the PSS/SSS/CRS for the RRM signal to which is transmitted in addition to the discovery signal in inter-frequency measurement gap of the UE 1 and UE 2 and report the RRM results that is the cell 1 is good to data transmission to cell 1 or the controlling eNB, or macro-eNB (833).

Thus, the UE 1 or UE 2 check the measurement signals on state cell 1 and may select to hand over using the measurement results (840, 841, 843 and 845). Herein the cell on (820) or off state (825) includes that cell off is a discontinuous transmission (DTX) cell for measurement signals so it can be a de-activated cell or a preset cell which is not to send and receive any measurement signals always, and cell on is a continuous transmission (DTX) cell for the measurement signals so it can be an activated cell or a preset cell which is send and receive any measurement signals always. So the UE 1 or UE 2 can perform cell (re)selection rapidly and accurately (837).

This invention also includes that the measurement results is sent to the serving cell of the UE 1 or UE 2 and the measurement can be periodic or aperiodic considering the cell on/off state. Also the UE 1 and UE 2 may perform the measurement by configuring one of a restricted measurement of radio link monitoring (RLM) and Radio Resource Management (RRM) for a Primary cell (Pcell), a restricted measurement of RRM on a cell indicated by a Physical Cell ID (PCI), or a restricted Channel State Information (CSI) measurement or measurement of RLM and RRM for a Pcell of a Macro eNB and a measurement of RLM and RRM for a Super Scell or a Master SCell of a small cell eNB (843).

Another issue for an advanced UE related to cell search or measurement is the case when cell on/off performing cells and legacy cells are coexisting. A simple example is shown in FIG. 9.

Figure 9:
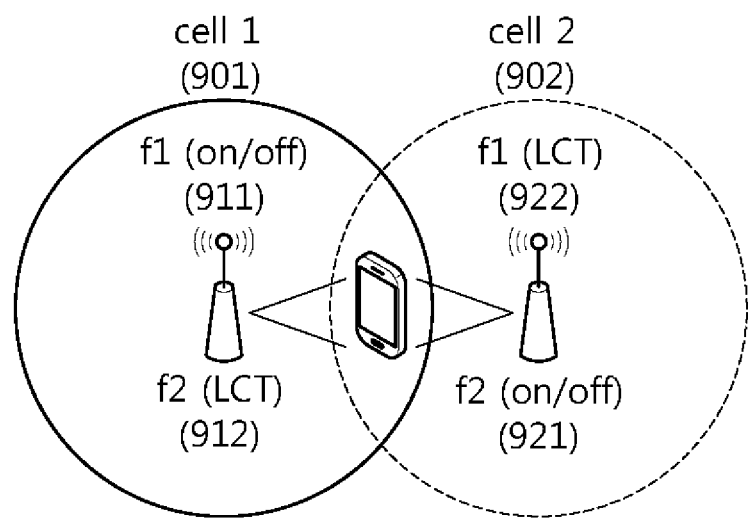
FIG. 9 shows an example of concept for cell on/off and legacy carriers coexistence which the present invention is applied.

FIG. 9 shows an example of concept for cell on/off and legacy carriers coexistence which the present invention is applied.

Assuming a UE can detect two cells (Cell1 and Cell2) (901, 902) where each cell has two carriers (f1 and f2) and use one carrier with on/off capability (911, 921) and the other carrier without on/off capability (912, 922). In terms of transmitting discovery signals, four options can be considered (1) discovery signal transmission is mandatory such that small cell always transmit discovery signal (2) discovery signal transmission can be supported optionally regardless of cell on/off functionality (3) discovery signal is transmitted only when cell on/off is applied (4) discovery signal is configurable such that carrier may choose transmitting discovery signal or not.

Thus, it would be necessary for an UE to know whether a carrier transmits discovery signal or not. In terms of identifying which signals to use for UE's measurement, a few alternative signaling mechanisms can be considered. If discovery signal is configurable, i.e., periodicity and/or offset of discovery signal can be configured by a serving cell such as macro-cell and a UE is configured with discovery signal information for a frequency, a UE puts the higher priority on discovery signal in cell search in that frequency. If it has not been configured with any discovery signal information, it assumes that discovery signal would not be used in that frequency. Whether to search carriers without discovery signals can be configurable or UE's choice or additional search without discovery signal assumed should be performed as well.

Whereas, if discovery signal is transmitted by advanced carrier, i.e., mandatory feature of new eNB, a UE may need to know whether the carrier is served by advanced eNB or not by blindly detect discovery signal. A UE would attempt to find discovery signal and legacy synchronization/measurement signals. For the cells identified by discovery signal, a UE may not perform legacy measurement process as the legacy measurement result may not be so efficient.

When a UE performs measurement on both signals for an advanced discovery signals and legacy synchronization and measurement signals, determining one of the both signals for an advanced discovery signals and legacy synchronization to report should be decided.

If event triggered or event triggered with periodic reporting is used, separate conditions used with each signal may be assumed. And thus, separate reporting can be assumed. Alternatively, regardless of discovery signal design, it may be assumed that UE reports based on single criteria (i.e., only one condition sets is available). Or, only the separate offsets are assumed. For example, if discovery signal is used for measurement, additional offset may be used where can be positive or negative which will be configured by the serving cell.

In terms of inter-frequency measurement, a UE within a configured measurement gap may search both signals or the serving cell may indicate the discovery signal type assumed for each frequency layer. However, for the same carrier identified by the cell ID and/or by other means, only one discovery signal type is assumed. The discovery signal type may be determined when cell detection occurs or a UE maintains both if found and repots only one. To consider a case where ambiguity exists i.e., the serving cell may not know which discovery signal type is used for measurement. A UE may report the type along with measurement report as well it can send the information upon the request from the serving cell. Furthermore, if an advanced UE is configured with non-legacy measurement gap pattern such as a longer measurement gap interval, e.g., 160 msec or 200 msec, it may assume that discovery signal would be used in inter-frequency measurement. More specifically, even an advanced UE may select legacy signals for its measurement when it knows that legacy signals are transmitted for better accuracy. Or, it can be configured by the serving cell which one to use even for UEs with supporting advanced discovery signals.

Figure 10:
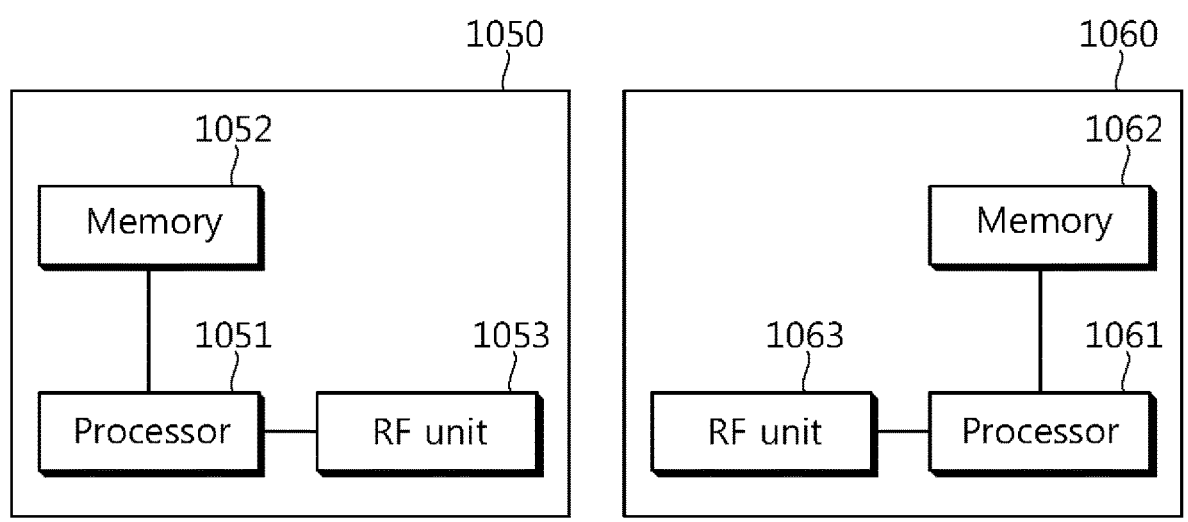
FIG. 10 shows a block diagram showing a wireless communication system according to an exemplary embodiment of the present invention.

FIG. 10 is a block diagram showing a wireless communication system according to an embodiment of the present invention.

A BS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 1051, and transmits and/or receives a radio signal. The processor 1051 implements the proposed functions, procedures, and/or methods. In the embodiments of FIG. 2 to FIG. 9, the operation of the BS can be implemented by the processor 1051.

Especially, the processor 1051 may configure one or more cells with different frequencies, for this invention the processor 1051 configures the cells to support Semi-Persistent Scheduling, TTI-bundling, HARQ-ACK procedures. The processor 1051 may configure a set of configurations between normal RACH, SRS or discovery signal in D2D configuration and advanced uplink configuration for an initiation request initiated by the UE to support a small cell environment. For example, for the initiation request by the UE before performing an RACH procedure, the processor 1061 may set and provide a preamble, frequency, sequence for the initiation request message of the UE, it can be assumed to use a user ID, resource, time information identified by detecting discovery signals. Herein, the processor 1051 may configure the discovery signal including a different PSS/SSS or transmitted with different periodicity or requirement from a legacy discovery.

That is, the processor 1051 may configure resource for a similar scheme for similar RACH procedure, PUCCH, PUSCH, or Semi-Persistent Reservation, etc. Also the processor 1051 may configure a set of uplink, SRS or RACH parameters including power between legacy UEs and advanced UEs. The user ID using as C-RNTI, P-RNTI, RA-RNTIs, SRS/RACH/uplink configuration, and power for them can be configured separately for each function of configuration. When it determines that aggregated configuration is needed, the user ID, SRS configuration, power for the cluster can be set to be assumed from a normal configuration with offset, delta, and difference value. The SRS configuration includes periodic and/or aperiodic SRS configuration.

Furthermore, the processor 1051 may reconfigure an additional uplink resource and re-usage of legacy uplink allocation so that uplink resource includes one of a whole bandwidth, a center 2, 4, 6 PRB, or consecutive 2 or 4 or 6 PRB within the bandwidth in which the discovery signal, the uplink resource of preamble format 1, 2, 4 according to a CP length can be used. And configuration index, sequence, frequency, etc are assumed and reused form the RACH configuration and SRS/D2D of discovery signal.

The wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 2 to FIG. 9, the operation of the UE can be implemented by the processor 1061.

Especially, for a small cell environment, the processor 1061 may configure resource for a initial request by using a similar scheme for a RACH or similar SRS or discovery signal in D2D procedure, PUSCH, or Semi-Persistent Reservation, etc. Also the processor 1061 may configure a user ID shared by the cells to detect a discovery signal and send an initial request message before acquiring system information and synchronization signals for RACH from the cell. Herein the processor 1061 may control and use an uplink resource predetermined for the initial request message, by using RACH configuration, SRS configuration for measurement or D2D discovery signal. That is, the processor 1061 may check whether a subset of configurations between legacy RACH/SRS/D2D and new uplink for the initial request message are configured, control power, subframe, and resource block for the new uplink for the initial request message. More details, the processor 1061 may configure a set of RACH, SRS or discovery signal in D2D parameters between normal RACH, SRS or discovery signal in D2D and advanced function for initiation request. For example of the initiation request before RACH procedure, the processor 1061 may receive and determine to configure that Preamble format, RACH Frequency, RACH Sequence using an ID identified by detecting discovery signals. Here, the discovery signal detected may be different from PSS/SSS or transmitted with different periodicity or requirement.

The processor 1061 may control to transmit the initial request message using a preamble and a cyclic prefix (CP) length acquired by the discovery signal to the cell being the DTX state, the cell being changed to a continuous transmission (TX) state for the system information and the synchronization signals from the DTX state by the initial request message when it is need to change the cell to wake up for data transmission or transmission efficiency. Thus, the processor 1061 can perform a Random Access (RACH) procedure by the initial request message of UE to order to change state of the cell from the DTX to TX before acquiring RACH configuration. It reads that more efficient and rapid initial access and data scheduling by the UE initiated are supported.

And, the processor 1061 may determine to be used different cell ID or virtual cell ID at scrambling so that a UE knows whether the cell is in active state or inactive state. Also, the processor 1061 configures adaptive measurement set including an advanced measurement for the restricted measurement and a legacy measurement object and performs measurement using a measurement signal at a subframe configured in the restricted measurement according to a measurement type in a measurement configuration. The processor 1061 may receive and check a measurement signal such as a discovery signal or a measurement reference signal (MRS) including CRS/TRS (or CSI-RS) at a predetermined PRB or resources. Also the processor 1061 may receive a measurement signal at a bandwidth predetermined according to a measurement target cell. The processor 1061 may performs the measurement by considering that a cell is on state or off state for the restricted measurement.

Wherein the processor 1061 can determine whether cell is on or off, and send the when the measurement type indicates the first measurement object, the cell indicated by the cell information is a discontinuous transmission (DTX) cell for the measurement signal, and when the measurement type indicates the second measurement object, the cell indicated by the cell information is a continuous transmission cell for the measurement signal. Also, wherein the wireless device 1060 can determine, when the measurement type indicates the first measurement object, the cell indicated by the cell information is a de-activated cell, and when the measurement type indicates the second measurement object, the cell indicated by the cell information is an activated cell. Or, the wireless device 1060 can determine, when the measurement type indicates the first measurement object, the cell indicated by the cell information is an off state cell for receiving the measurement signal, and when the measurement type indicates the second measurement object, the cell indicated by the cell information is an on state cell for receiving the measurement signal.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a configuration in a wireless communication system, the method comprising:
    transmitting, by a base station (BS), a measurement gap configuration of a legacy user equipment (UE) measurement gap;
    determining, by the base station, whether to transmit an additional discovery signal to support the legacy UE measurement gap; and
    transmitting, by the BS, the configuration for a discovery signal,
    wherein the configuration indicates a periodicity and an offset of the discovery signal,
    wherein the discovery signal is used to perform a measurement by a UE,
    wherein the discovery signal includes a Primary Synchronization Signal (PSS), a Secondary Synchronization Signal (SSS), and a Cell-specific Reference Signal (CRS), received within a predefined duration,
    wherein the offset of the discovery signal is in a number of subframe(s),
    wherein the predefined duration for transmitting all of the PSS, SSS, and CRS is set to 6 milliseconds,
    wherein the periodicity for transmitting all of the PSS, SSS, and CRS is set to 40 milliseconds or 80 milliseconds,
    wherein the transmitted CRS is not used for a data demodulation,
    wherein the discovery signal is transmitted from a cell configured to support on/off operation, and
    wherein the discovery signal is transmitted when the cell is in an off-state.

2. The method of claim 1, wherein the configuration is transmitted via a higher layer signaling.

3. The method of claim 1, wherein the measurement is a discovery signal based Radio Resource Management (RRM) measurement.

4. A base station (BS) for transmitting a configuration in a wireless communication system, the BS comprising:
    a transceiver configured to transmit or receive a radio signal; and
    a processor configured to:
    transmit a measurement gap configuration of a legacy user equipment (UE) measurement gap,
    determine whether to transmit an additional discovery signal to support the legacy UE measurement gap, and
    transmit, via the transceiver, the configuration for a discovery signal,
    wherein the configuration indicates a periodicity and an offset of the discovery signal,
    wherein the discovery signal is used to perform a measurement by a UE,
    wherein the discovery signal includes a Primary Synchronization Signal (PSS), a Secondary Synchronization Signal (SSS), and a Cell-specific Reference Signal (CRS), received within a predefined duration,
    wherein the offset of the discovery signal is in a number of subframe(s),
    wherein the predefined duration for transmitting all of the PSS, SSS, and CRS is set to 6 milliseconds,
    wherein the periodicity for transmitting all of the PSS, SSS, and CRS is set to 40 milliseconds or 80 milliseconds,
    wherein the transmitted CRS is not used for a data demodulation,
    wherein the discovery signal is transmitted from a cell configured to support on/off operation, and
    wherein the discovery signal is transmitted when the cell is in an off-state.

5. The BS of claim 4, wherein the configuration is transmitted via a higher layer signaling.

6. The BS of claim 4, wherein the measurement is a discovery signal based Radio Resource Management (RRM) measurement.

* * * * *